May 7, 1935.  E. A. PRUDHOMME  2,000,096
PROCESS FOR MANUFACTURING FORMALDEHYDE
Filed July 20, 1931
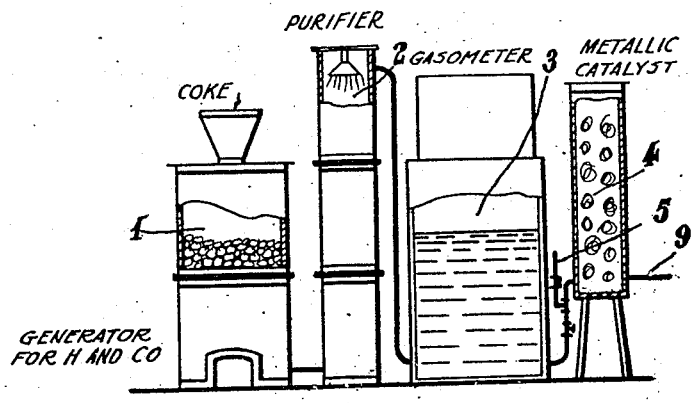
Eugene Albert Prudhomme
By Pennie, Davis, Marvin & Edmonds
Attorneys.

Patented May 7, 1935

2,000,096

UNITED STATES PATENT OFFICE 2,000,096

PROCESS FOR MANUFACTURING FORMALDEHYDE

Eugène Albert Prudhomme, Levallois-Perret, France, assignor to Lucien Henri Roman, Paris, France Application July 20, 1931, Serial No. 551,976
In France July 19, 1930

4 Claims. (Cl. 260—138)

(Granted under the provisions of sec. 14, act of March 2, 1927; 357 O. G. 5)

The synthetic processes now used for the manufacture of organic products from their constitutive elements or from their simplest combinations, require the use of high pressures and temperatures. This necessitates complicated and sturdy apparatus, involving heavy expenses.

With the process according to the present invention it is possible, on the contrary, to manufacture industrially aldehydes, alcohols, sucrates or saccharates and carbohydrates in general, from gases containing hydrogen and carbon monoxide, with the use of low temperatures (between 130° and 200° C.) and very low pressures (Ok. 500 maximum).

The object of the first phase of the process is to obtain an aldehyde, formaldehyde. According to said process, the gas containing hydrogen and carbon monoxide, such as water gas, blast furnace gas, etc. previously purified, is subjected, under normal pressure and at a temperature included between 130° and 200° C., to the action of a catalyst depolarized and highly-activated by a gas or vapor which does not enter into the composition of the final product obtained, but which is capable of forming temporary and unstable combinations with the catalyst.

The process also enables alcohols to be obtained, for example ethyl alcohol. The gas is in that case treated as before, under the same conditions of temperature and pressure, on a similar catalyst, with, however, an increase in the time of contact and a reduction in the speed of flow of the gases.

It is observed that there is a decrease in the production of the aldehydes and that vapors of ethyl alcohol are obtained which are condensed according to the usual methods.

The recovery of the gases containing hydrogen and carbon monoxide, or the manufacture of water gas, are current practice and do not require describing. It is known that by means of suitable methods, compounds of approximately 50% of CO and 50% of H can be obtained.

The proportions of the mixtures CO+H may, according to the products to be obtained, undergo any modifications, either by enrichment in H or impoverishment in CO.

Similarly the purification of said gases containing hydrogen and carbon monoxide, for the elimination therefrom of the harmful or useless elements such as $H_2S$, $H_3As$, $CO_2$ etc. is well known and need not be described.

The gas containing hydrogen and carbon monoxide thus obtained and purified is passed into an apparatus heated to a suitable temperature (130° to 200° C.) in order to undergo therein a catalytic action on reduced metals or metallic oxides, such as nickel, iron, cobalt, copper, platinum, palladium, etc. The gas is maintained in the apparatus at a pressure approaching the normal.

It is known that the mixture CO+H may under such conditions produce methane when the proportion of the gases CO and H is favorable. In the case in which the mixture CO+H does not correspond to the ideal formula

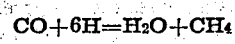
$$CO+6H=H_2O+CH_4$$

methane may still be formed, but the reaction is then only partial.

During the above transformations, it has been observed that aldehydes (formic, benzylic, etc.) are produced. But from this point the action of the catalyst slows down considerably and rapidly tends towards zero.

The present process is characterized by the action on the mixtures of H+CO gas, proportioned beforehand, of certain gases or vapors which do not combine with the product finally obtained, but which set up a kind of depolarization of the catalyst so as to maintain its activity constant. Said depolarization results in a momentary depolymerization of the aldehydes, since a temporary polymerization of the aldehydes progressively obstructs the catalyst and the action of the gases depolymerizes and liberates aldehydes, so that the catalyst is thus reactivated. Said gases or vapors can be those which give rise to temporary unstable formations with the oxides or catalyst metals. Amongst the latter chlorine, bromine, iodine, nitrogen, oxide of nitrogen, etc. may be utilized as required, and as the case may be stabilizers such as sulphuretted, arsenicated gases, etc. The addition of one of said gases is regulated in practice by automatic distributing apparatus regulated beforehand at the optimum rate.

The aldehydes formed are collected by the known methods. The composition of the aldehydes will vary with the temperature of the catalyst and the composition of the reactional gases. By this method different aldehydes, and particularly formaldehyde, may be collected continuously and indefinitely.

Said aldehydes have varied uses and the formaldehyde thus obtained is eminently suitable for the manufacture of alkaline and alkaline-earth sucrates or saccharates, in particular, and carbohydrates in general.

By way of example an application of the process according to the invention to the manufacture of formaldehyde will be described hereafter, the apparatus used being the one shown in the accompanying drawing.

The water gas from the gas generator 1 is treated in a purifier 2 by an alkaline solution in order to remove its harmful components $H_2S$ and $CO_2$. Said gas is then collected in a gasometer 3. The purified gas is passed through a nickel catalyst 4 of known type and constituted for example by nickel spirals covered with powdered nickel known as "reduced nickel". The catalysis chamber is heated to a temperature approaching 175° C. ($+$ or $-$ 10°). In said chamber the purified gas undergoes a transformation and the greater part of it passes into the state of formaldehyde. During said reaction, a slowing down of the catalytic action may be observed, which tends towards zero. The current of water gas through the catalyst is stopped after 90 seconds ($+$ or $-$ 10 seconds) and is replaced by a current of nitrogen for a period of 30 seconds ($+$ or $-$ 5 seconds). Said nitrogen issues for example from an additional pipe 5. The current of water gas is then passed again and so forth.

Having now particularly described and ascertained the nature of my said invention, and in what manner the same is to be performed, I declare that what I claim is:

1. A process for the manufacture of formaldehyde, comprising passing a current of gas containing essentially hydrogen and carbon monoxide, under normal pressure and at a temperature ranging between 130° and 200° C., through a hydrogenation catalyst of the nickel group of the periodic system, for intervals of time of 80 to 100 seconds, periodically cutting off said current of gas, and periodically passing a current of nitrogen gas through said catalyst for intervals of time of 25 to 35 seconds alternating with the periods of flow of said first gas.

2. A process for the manufacture of formaldehyde which comprises passing a current of gas containing essentially hydrogen and carbon monoxide, at a temperature ranging between 130° C. and 200° C., through a hydrogenation catalyst of the nickel group of the periodic system until the catalyst becomes polarized by polymerization of aldehydes formed by the reaction of the hydrogen and the carbon monoxide, and then passing a current of gas consisting essentially of nitrogen through said catalyst to cause depolarization thereof.

3. A process for the manufacture of formaldehyde, which comprises passing a current of gas containing essentially hydrogen and carbon monoxide, under normal pressure and at a temperature ranging between 130° C. and 200° C., through a hydrogenation catalyst of the nickel group of the periodic system until the catalyst becomes polarized by polymerization of aldehydes formed by the reaction of the hydrogen and carbon monoxide, periodically cutting off said current of gas, and passing a current of gas consisting essentially of nitrogen through said catalyst, during the periods when the first current of gas is cut off, to cause depolarization of the catalyst.

4. A process for the manufacture of formaldehyde, which comprises passing a current of gas containing essentially hydrogen and carbon monoxide, under normal pressure and at a temperature ranging between 130° C. and 200° C., over a reduced metal from the group consisting of nickel, iron, cobalt, copper, platinum and palladium, until the reduced metal becomes polarized by polymerization of aldehydes formed by the reaction of the hydrogen and carbon monoxide, periodically cutting off said current of gas, and passing a current of gas consisting essentially of nitrogen over said reduced metal, during the periods when the first current of gas is cut off, to cause depolarization of the reduced metal.

EUGÈNE ALBERT PRUDHOMME.

CERTIFICATE OF CORRECTION.

Patent No. 2,000,096.  May 7, 1935.

EUGENE ALBERT PRUDHOMME.

It is hereby certified that the above numbered patent was erroneously issued to "Lucien Henri Roman, of Paris France," as assignee, whereas said patent should have been issued to Carboxhyd Ltd., Geneva, Switzerland, a joint stock company of Switzerland, as assignee by mesne assignments of the entire interest in said invention, as shown by the records of assignments in this office; and that the said Letters Patent should be read with this correction therein that the same may conform to the record of the case in the Patent Office.

Signed and sealed this 18th day of June, A. D. 1935.

(Seal)

Leslie Frazer
Acting Commissioner of Patents.